(12) United States Patent
Acharya et al.

(10) Patent No.: US 11,945,116 B2
(45) Date of Patent: Apr. 2, 2024

(54) DIAGNOSIS METHOD AND APPARATUS

(71) Applicant: ABB Schweiz AG, Baden (CH)

(72) Inventors: Mithun Acharya, Cary, NC (US);
Boris Fiedler, Wiesbaden (DE);
Benjamin Kloepper, Mannheim (DE);
Karl Severin, Norwalk, CT (US)

(73) Assignee: ABB Schweiz AG, Baden (CH)

( * ) Notice: Subject to any disclaimer, the term of this patent is extended or adjusted under 35 U.S.C. 154(b) by 661 days.

(21) Appl. No.: 17/146,499

(22) Filed: Jan. 12, 2021

(65) Prior Publication Data
US 2021/0129324 A1 May 6, 2021

Related U.S. Application Data

(63) Continuation of application No. PCT/EP2018/069114, filed on Jul. 13, 2018.

(51) Int. Cl.
B25J 9/00 (2006.01)
B25J 9/16 (2006.01)
(Continued)

(52) U.S. Cl.
CPC .......... B25J 9/1658 (2013.01); B25J 9/003 (2013.01); B25J 9/0084 (2013.01); B25J 9/1661 (2013.01);
(Continued)

(58) Field of Classification Search
CPC ...... B25J 9/1658; B25J 9/1661; B25J 9/1697; B25J 9/1689; B25J 9/003; B25J 19/0095;
(Continued)

(56) References Cited

U.S. PATENT DOCUMENTS 4,835,730 A * 5/1989 Shimano ............... B25J 9/1661
700/247
8,930,009 B2 * 1/2015 Miyoshi ............... B25J 9/1679
438/694
(Continued)

FOREIGN PATENT DOCUMENTS

EP 2728428 A1 5/2014
WO WO1999032950 A1 * 7/1999
(Continued)

OTHER PUBLICATIONS

Jun Tang et al., "Gaining diagnostic information for fault isolation", IEEE International Conference on Information and Automation (ICIA) Aug. 2013 (pp. 665-670).*
(Continued)

Primary Examiner — Srirama Channavajjala
(74) Attorney, Agent, or Firm — Leydig, Voit & Mayer, Ltd.

(57) ABSTRACT

A method for problem diagnosis in a robot system having one or more robots includes the steps of: a) receiving (S1) a first problem message from a robot of the robot system, the first problem message including one or more data elements descriptive of a problem experienced by the robot; b) receiving (S1) a subsequent problem message from a robot of the robot system; c) if a time elapsed between receipt of the subsequent problem message and receipt of an immediately preceding problem message is shorter than a predetermined threshold (S2), adding the subsequent problem message to a message set which comprises the immediately preceding problem message (S3); and d) if the time elapsed is longer than the predetermined threshold (S2), terminating (S4) the message set of the immediately preceding problem message without adding the subsequent problem message, and establishing (S5, S6) a new message set.

5 Claims, 2 Drawing Sheets

(51) Int. Cl.
*B25J 13/00* (2006.01)
*B25J 13/08* (2006.01)
*H04L 67/00* (2022.01)
*H04L 67/303* (2022.01)

(52) U.S. Cl.
CPC ........... *B25J 9/1689* (2013.01); *B25J 9/1697* (2013.01); *B25J 13/006* (2013.01); *B25J 13/08* (2013.01); *B25J 13/085* (2013.01); *H04L 67/303* (2013.01); *H04L 67/34* (2013.01)

(58) Field of Classification Search
CPC ...... B25J 13/025; B25J 9/0084; B25J 13/085; B25J 13/006; B25J 13/08; G05B 2219/39413; G05B 2219/33286; H04L 67/025; H04L 67/01; H04L 67/303; H04L 67/34; G06F 9/5038; G06F 11/008; G06F 11/0766; G06F 11/079; G06F 11/0793; G06F 11/2257; G06F 11/2268; G06F 11/2273; G06Q 10/1097; G06N 7/005
See application file for complete search history.

(56) References Cited

U.S. PATENT DOCUMENTS

| | | | | |
|---|---|---|---|---|
| 9,566,710 | B2* | 2/2017 | Passot | .................... G06N 20/00 |
| 10,059,000 | B2* | 8/2018 | Herzog | ..................... B25J 5/00 |
| 2004/0268151 | A1* | 12/2004 | Matsuda | ............. G06F 21/6218 726/11 |
| 2006/0145647 | A1* | 7/2006 | Kitatsuji | .............. G05B 19/414 318/568.11 |
| 2011/0072382 | A1* | 3/2011 | Caldwell | ............ G05B 23/0216 715/772 |
| 2011/0113104 | A1* | 5/2011 | Bhogal | ................ G06Q 10/107 709/206 |
| 2016/0144512 | A1* | 5/2016 | Kim | ........................ B25J 9/1697 348/46 |
| 2017/0308069 | A1 | 10/2017 | Entzminger et al. | |
| 2018/0292803 | A1* | 10/2018 | Kurek | .................. G05B 19/401 |
| 2019/0047152 | A1* | 2/2019 | Tonogai | ............... B25J 9/1697 |
| 2019/0094846 | A1* | 3/2019 | Xiong | ............... G05B 23/0264 |

FOREIGN PATENT DOCUMENTS

| | | |
|---|---|---|
| WO | WO2007041295 A2 * | 4/2007 |
| WO | WO2016174594 A1 * | 11/2016 |
| WO | WO 2016174594 A1 | 11/2016 |

OTHER PUBLICATIONS

Hongmei Fan, "The robot remote monitoring and fault diagnosis system base on wireless network", 2010 International Conference on Computer Application and System Modeling (ICCASM 2010) Nov. 2010, (vol. 12, pp. V12-425-V12-429).*

* cited by examiner

DIAGNOSIS METHOD AND APPARATUS

CROSS-REFERENCE TO PRIOR APPLICATION

This application is a continuation of International Patent Application No. PCT/EP2018/069114, filed on Jul. 13, 2018, the entire disclosure of which is hereby incorporated by reference herein.

FIELD

The present invention relates to a method for efficiently diagnosing the origin of a technical problem in a robot system comprising one or more robots.

BACKGROUND

Diagnosing the origin of a technical problem in a multi-robot system such as a manufacturing plant in which robots carry out successive steps in the manufacture of a product can be a very difficult and time-consuming task, since a problem which manifests itself in incorrect execution of a manufacturing step by a given robot may have its reasons in a previous manufacturing step which is carried out incorrectly without being noticed. Software bugs may also cause a robot to malfunction, without a defect of the robot being visible.

In order to facilitate identification and removal of a malfunction, it is known to collect problem messages from the robots of such a system, so that when the system should actually fail, there is a good chance that the reasons for such a failure can be ascertained from the problem messages generated by the robots. However, in practice there is a high probability that most of these problem messages will relate to issues which have nothing to do with the actual failure, so that the more robots and other message-issuing components there are, the larger becomes the number of messages that have to be studied in order to find the reasons for a specific technical problem.

SUMMARY

In an embodiment, the present invention provides a method for problem diagnosis in a robot system comprising one or more robots, the method comprising the steps of: a) receiving (S1) a first problem message from a robot of the robot system, the first problem message comprising one or more data elements descriptive of a problem experienced by the robot; b) receiving (S1) a subsequent problem message from a robot of the robot system; c) if a time elapsed between receipt of the subsequent problem message and receipt of an immediately preceding problem message is shorter than a predetermined threshold (S2), adding the subsequent problem message to a message set which comprises the immediately preceding problem message (S3); d) if the time elapsed is longer than the predetermined threshold (S2), terminating (S4) the message set of the immediately preceding problem message without adding the subsequent problem message, and establishing (S5, S6) a new message set in which the subsequent problem message is the first message; e) in a terminated message set, identifying (S7) at least one descriptive data element which is frequent in the problem messages of the terminated message set or which occurs in a first message of the terminated message set; and f) assigning (S8) the at least one descriptive data element as a name to the terminated message set.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
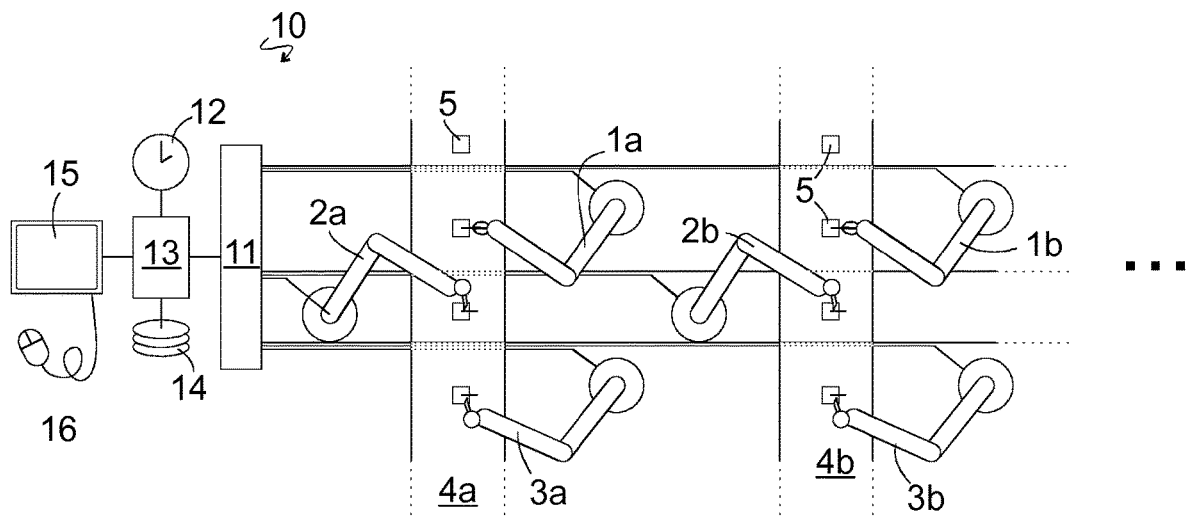
FIG. 1 is a schematic view of a robot system in which the present invention is applicable.

In an embodiment, the present invention provides a method and an apparatus which make finding the reasons for a technical problem in a robot system easier and faster.

In an embodiment, the present invention provides a method for problem diagnosis in a robot system comprising one or more robots, the method comprising the steps of:
a) receiving a first problem message from a robot of said robot system, the problem message comprising one or more data elements descriptive of a problem experienced by the robot;
b) receiving a subsequent problem message from a robot of said robot system;
c) if a time elapsed between receipt of said subsequent message and receipt of an immediately preceding message is shorter than a predetermined threshold, adding said subsequent message to a message set which comprises said immediately preceding message;
d) if the time elapsed is longer than the predetermined threshold, terminating the message set of the immediately preceding message without adding the subsequent message, and establishing a new message set in which said subsequent message is the first message;
e) in a terminated message set, identifying at least one descriptive data element which is frequent in the messages of the set; and
f) assigning said at least one descriptive data element as a name to the terminated message set.

The method reflects the inventors' insight that problem messages tend to be clustered in time, and that problem messages that are generated closely one after the other tend to have a common cause. Therefore, the search for the cause of problem messages is facilitated if such messages generated closely one after the other are grouped into message sets, and if it is assumed that the messages of such a set have a common cause. If texts of the problem messages are appropriately chosen, common terms in the problem messages of one set can be indicative of the common cause, so that if such common terms form the name assigned to such a set, the name may identify the cause of the problem or at least give a practitioner a valuable hint what the cause of the problem might be.

Alternatively, a descriptive data element from a first message of a terminated message set may be chosen for naming the set, based on the assumption that the first problem message of a set is likely to be caused most directly by the problem that gave rise—directly or indirectly—to subsequent messages of the set, too, and that therefore the first message is most likely to name clearly the reason for the error messages.

If only the names of the sets are output in a list, the amount of data a human practitioner has to inspect in order to find or to guess a cause of the problem is considerably reduced with respect to the conventional situation in which the practitioner has to inspect the problem messages as such, so that the practitioner can at least form a reasonable guess as to the cause of the problem in short time.

Confirmation of the guess may still require a detailed inspection of problem messages. Such an inspection is facilitated considerably if the outputting step comprises outputting said names on a screen and associating to each name a hyperlink by which the messages of the set bearing the name can be accessed.

At a larger time scale, identification of recurring problems can be facilitated by the step of identifying in a plurality of terminated message sets those sets whose names comprise identical descriptive data elements, and displaying, on a screen, symbols associated to said sets such that a distance between symbols of sets having identical descriptive data elements is smaller than between symbols of sets having different descriptive data elements. In that way, any cluster of symbols on the screen can be easily identified as possibly being linked by a common cause.

In a preferred embodiment, the symbols are displayed in a two-axis diagram wherein one of the axes is representative of time and the distance is a distance measured perpendicular to said one axis. Thus, symbols having a common cause are easily recognizable since they tend to form a line parallel to said one axis.

The object is also achieved by an apparatus for diagnosing problems in a robot system, in particular for carrying out the method as described above, the system comprising one or more robots, the apparatus comprising an interface for receiving problem messages from the robots of the system;

processing means for, if a time elapsed between receipt of a subsequent message and receipt of an immediately preceding message is shorter than a predetermined threshold, adding said subsequent message to a message set which comprises said immediately preceding message, or, if the time elapsed is longer than the predetermined threshold, terminating the message set of the immediately preceding message without adding the subsequent message, and establishing a new message set in which said subsequent message is the first message;

for identifying, in a terminated message set, at least one descriptive data element which is frequent in the messages of the set; and for assigning said at least one descriptive data element as a name to the terminated message set.

In order to facilitate access to the problem messages, the apparatus should further comprise a screen for outputting thereon names assigned to or symbols associated to said terminated message sets and a pointing instrument for selecting one of the names or symbols outputted on the screen. Such a pointing instrument can be e.g. a mouse by which a user can place a cursor displayed on the screen on a specific message set to be opened, or a touchscreen overlying the screen, which enables a user to select a symbol in the screen by touching it with e.g. a finger.

Further features and advantages of the invention will become apparent from the subsequent description of embodiments thereof referring to the appended drawings.

FIG. 1 illustrates a robot system and a diagnosing apparatus embodying the present invention, which is applied to the robot system. The robot system comprises robots such as 1a, 2a, 3a, . . . which sequentially carry out successive processing steps on a same workpiece 5, and robots such as 1a, 1b, which carry out a same processing step in parallel on different workpieces 5. Each robot comprises sensors for detecting one or more operation parameters whose values might indicate a possible malfunction of the system and for generating a problem message if one of the operation parameters is outside an expected range.

The diagnosing apparatus 10 comprises an interface 11 for receiving the problem messages from the sensors of the robot system, a timer 12, a central processor 13, a storage device 14 for storing received problem messages and timing information associated to each problem message, a display screen 15 and a pointing instrument 16. The pointing instrument 16 can be a mouse, as suggested by FIG. 1, a touch-sensitive layer on display screen 15, or the like.

Figure 2:
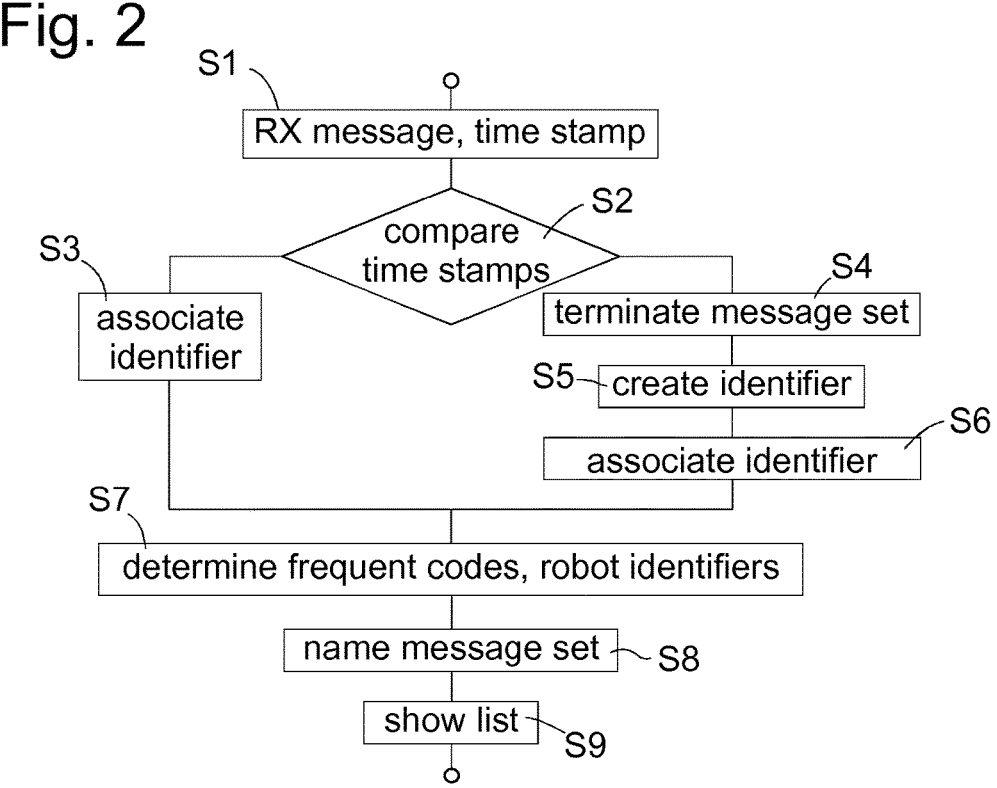
FIG. 2 is a flowchart of the method of the invention.

FIG. 2 is a flowchart of a method carried out by the diagnosing apparatus 10. The method can be carried out on-line, while problem messages are being received from the sensors, or off-line, processing problem messages retrieved from the storage device 14. In on-line mode, when a problem message is received from a sensor in step S1, the processor 13 associates it a time stamp from timer 12. In off-line mode, the problem message and the time stamp associated to it earlier are retrieved from storage device 14. The processor 13 compares the time stamp to that of an immediately preceding problem message in step S2. If the time stamps differ by less than a predetermined threshold of, say, between 1 and 10 minutes, it is decided that they belong to a same message set, and an identifier of the message set is stored in association to the problem message in storage device 14 (S3). If they differ by more than the threshold, it is assumed that the set to which the immediately preceding problem message belonged is complete; so this message set is terminated (S4), a new message set identifier is created (S5) and is stored in association to the problem message in storage device 14 (S6). In that way, at any instant in time, all problem messages that have been collected up to that instant are assigned to one message set.

The problem messages stored in storage device 14 preferably each comprise an identifier of the robot or the sensor from which they originate, and a code associated to a specific type of problem.

In step S7, the processor 13 identifies, in each message set, the most frequent code (or a small number of the most frequent codes) and the most frequent robot identifier.

In step S8, each message set is assigned a name which comprises the most frequent code (or a combination of the most frequent codes). If there is one robot identifier which occurs in the problem messages of the message set with a considerably higher frequency than others, the robot identifier (e.g. "2a" in the first line of the list of FIG. 3) can be included in the name. If a message set comprises just one problem message, the name of the message set can be the problem message itself.

Ideally, the codes are chosen so that the name which is given to a message set in step S8 directly identifies the cause for the problem messages. In practice, a user who tries to find this cause will in many cases wish to expect the problem messages in detail, and is faced with the problem of identifying, in a plethora of stored messages, those which are indeed related to a problem he has observed and is trying to solve.

Figure 3:
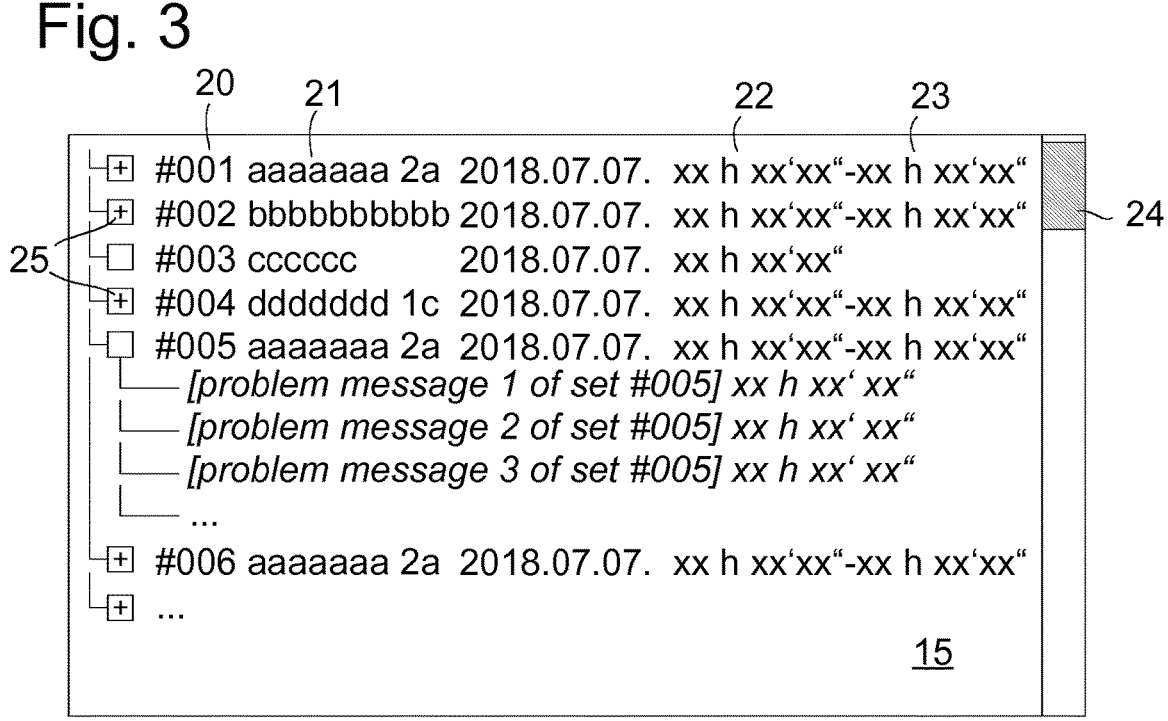
FIG. 3 is a schematic screenshot of a display screen of the apparatus for diagnosing problems shown in FIG. 1.

When this user inputs a request to be shown the problem messages, in step S9 he is shown a list of message sets, each one identified by the name given to it in step S8. Since this name may not be unique (in fact if a problem occurs repeatedly, the message sets associated to it should have identical names) a number or other unique identifier should be associated to each message set. Such a list may appear on display screen 15 e.g. as shown in FIG. 3: Each message set is assigned a line on display screen 15 which contains the number 20 and the name 21 of the message set, and the time it was generated, i.e. the time stamp 22 of its first problem message and, preferably, also the time stamp 23 of its last message.

Even if the user is not looking for the cause of an existing problem but is merely performing a routine check, the concise list of message sets can provide him with a quick overview of where operation of the system might not be optimal and where problems might arise in the future.

The user can review the list of message sets by hand, using e.g. a scroll bar 24 and the pointing instrument 16 for moving up and down in the list and for selecting a given message set in it; preferably, he can also input a filter instruction, so that only those message sets are shown in the list which satisfy a filter criterion, e.g. whose names contain a reference to a specific problem observed by the user or to a specific robot which was observed not to operate properly.

At least all those lines of the list which are associated to message sets comprising more than one message comprise a hyperlink 25 which the user can select and activate using the pointing tool 16. When the hyperlink 25 is activated, the problem messages of the message set are displayed, e.g. by opening a new window on screen 15, or by inserting the problem messages 26 below the line of their respective message set in the window shown in FIG. 3.

Figure 4:
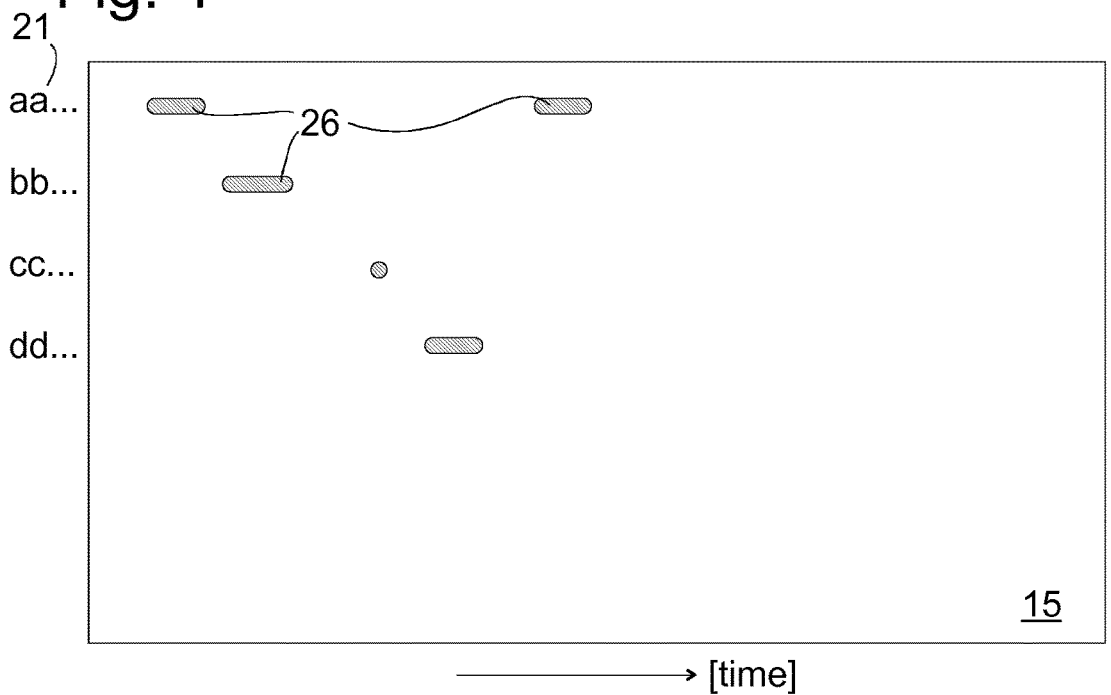
FIG. 4 is a second schematic screenshot.

An alternative display mode by which an overview over a very large number of problem messages can be obtained in a short time is shown in FIG. 4. Here, a two dimensional diagram is displayed on screen 15, one of the two axes being a time scale, the other displaying the names of the message sets. Each message set is represented as a symbol 26, e.g. a point or a line, in the diagram, the location of which in the two coordinates is defined by its name and the time stamps of its problem messages. The symbols can be assigned different colours representative of the number or frequency of problem messages in a set, or of their criticality, i.e. their likeliness to cause damage if not at tended to.

The symbols 26 can be selected and activated using pointing instrument 16, activation causing a list of the problem messages forming the selected message set to be displayed on screen 15.

Here, the two message sets named "aaaaaaa" of FIG. 3 appear in a same line; therefore, repetitive problems associated to message sets having a same name are immediately discernible. Further, causal relationships between the problems of different message sets are easily recognized since they tend to form regular patterns in the diagram of FIG. 4.

In the diagram of FIG. 4, it is helpful not only to place identically named message sets in a same line parallel to the time axis, but also to place messages having similar names into closely adjacent lines. Such a similarity may result from a name giving problem being common to several robots, or from a robot whose identifier appears in a message set name suffering from several problems. In either case there is a high probability that the problems have a common cause which, by the juxtaposition of the lines, becomes easier for the user to notice.

In the method as described above, there can be no overlap in time between two message sets, since problem messages, even if they originate from different robots, will be lumped into a same message set if the time between them is short enough. This may make it difficult to identify the cause of a problem in a very large system where two or more simultaneous causes may trigger problem messages. In that case, the system may be divided into a plurality of subsystems, and the method may be applied separately to each subsystem, e.g. to robots 1a, 1b, . . . that perform a same task in the system of FIG. 1, or to robots 1a, 2a, . . . associated to a same assembly line 4a. In fact, it is advisable to use different divisions into subsystems concurrently, since if the division is done by assembly lines, it is easy to recognize that problem messages originating from robots 1a, 2a but not from robots 1b, 2b might have a cause in assembly line 4a, whereas if the division is done by assembly stages, a problem message generated by several robots 2a, 2b of the same stage is easily recognizable as related to a common supply of these robots.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1a, 1b, . . . robot
2a, 2b, . . . robot
3a, 3b, . . . robot
4a, 4b, . . . assembly line
5 workpiece
10 diagnosing apparatus
11 interface
12 timer
13 processor
14 storage device
15 display screen
16 pointing instrument
20 number
21 name
22 time stamp
23 time stamp
24 scroll bar
25 hyperlink
26 symbol

What is claimed is:

1. A method for problem diagnosis in a robot system comprising one or more robots, the method comprising:
   a) receiving a first problem message from a robot of the robot system, the first problem message comprising one or more data elements descriptive of a problem experienced by the robot;
   b) receiving a subsequent problem message from a robot of the robot system;
   c) if a time elapsed between receipt of the subsequent problem message and receipt of an immediately preceding problem message is shorter than a predetermined threshold, adding the subsequent problem message to a message set which comprises the immediately preceding problem message;
   d) if the time elapsed between receipt of the subsequent problem message and receipt of the immediately preceding problem message is longer than the predetermined threshold, terminating the message set of the immediately preceding problem message without adding the subsequent problem message, and establishing a new message set in which the subsequent problem message is the first message;
   e) in a terminated message set, identifying at least one descriptive data element which is frequent in the problem messages of the terminated message set or which occurs in a first message of the terminated message set;
   f) assigning the at least one descriptive data element as a name to the terminated message set; and
   g) identifying in a plurality of terminated message sets certain terminated message sets whose names comprise identical descriptive data elements, and displaying, on a screen, symbols associated with the certain terminated message sets such that a distance between symbols of the certain terminated message sets having identical descriptive data elements is smaller than between symbols of remaining terminated message sets having different descriptive data elements.

2. The method of claim 1, further comprising outputting a list of names of terminated message sets.

3. The method of claim 2, wherein outputting the list of names of terminated message sets comprises outputting names of terminated message sets on the screen and associating each name of the names with a hyperlink by which messages of a terminated message set bearing each name of the names are accessible.

4. The method of claim 1, wherein the symbols are displayed in a two-axis diagram, and
   wherein one axis of the two-axis diagram is representative of time and the distance comprises a distance measured perpendicular to the one axis.

5. An apparatus for diagnosing problems in a robot system comprising one or more robots, the apparatus comprising:
   an interface configured to receive problem messages from the robots of the system;
   a processing means configured to:
      if a time elapsed between receipt of a subsequent problem message and receipt of an immediately preceding problem message is shorter than a predetermined threshold, add the subsequent problem message to a message set which comprises the immediately preceding problem message, or, if the time elapsed is longer than the predetermined threshold, terminate the message set of the immediately preceding problem message without adding the subsequent problem message, and establish a new message set in which the subsequent problem message is the first message,
      identify, in a terminated message set, at least one descriptive data element which is frequent in the problem messages of the terminated message set, and
      assign the at least one descriptive data element as a name to the terminated message set; and
   a screen configured to output thereon names assigned to, or symbols associated with, each terminated message set such that a distance between symbols of certain terminated message sets having identical descriptive data elements is smaller than between symbols of remaining terminated message sets having different descriptive data elements, and a pointing instrument for selecting names or symbols on the screen.

* * * * *